United States Patent [19]

Reich

[11] 4,249,885
[45] * Feb. 10, 1981

[54] HEAVY FUEL OIL NOZZLE

[75] Inventor: Richard B. Reich, Streamwood, Ill.

[73] Assignee: Vapor Corporation, Chicago, Ill.

[*] Notice: The portion of the term of this patent subsequent to Feb. 27, 1996, has been disclaimed.

[21] Appl. No.: 926,186

[22] Filed: Jul. 20, 1978

Related U.S. Application Data

[62] Division of Ser. No. 693,138, Jun. 7, 1976, Pat. No. 4,141,505.

[51] Int. Cl.³ .............................................. F23N 1/00
[52] U.S. Cl. ..................................... 431/38; 431/208; 431/158; 431/187; 137/92; 239/431
[58] Field of Search ................... 431/42, 38, 208, 158, 431/187, 188, 351, 89; 137/13, 92, 334; 239/431, 434

[56] References Cited

U.S. PATENT DOCUMENTS

| | | | |
|---|---|---|---|
| 777,680 | 12/1904 | Lassoe et al. | 239/434 |
| 2,933,259 | 4/1960 | Raskin | 239/431 |
| 3,133,731 | 5/1964 | Reed | 431/187 |
| 3,266,550 | 8/1966 | Sick et al. | 431/9 |
| 3,670,752 | 6/1972 | Marsden, Jr. et al. | 137/13 |
| 3,977,427 | 8/1976 | Reed et al. | 137/13 |
| 4,141,505 | 2/1979 | Reich | 239/431 |

Primary Examiner—Samuel Scott
Assistant Examiner—Lee E. Barrett
Attorney, Agent, or Firm—Francis J. Lidd

[57] ABSTRACT

An atomizing nozzle particularly suited for your use in compact combustion chambers. Successful combustion of liquid fuels having generally high viscosity and widely varying properties such as distillation temperatures, distillation rates and impurities, including "heavy" and waste oil. Improved combustion is accomplished through the use of viscosity control and improved fuel atomization. Use of a nozzle utilizing "shearing" of the fuel by an atomizing fluid stream which intersects the fuel at approximately right angles. Recombination of liquid fuel particles is prevented by the use of a controlled "exit orifice" in the burner nozzle. The nozzle also features continuous circulation of the fuel in the nozzle body which establishes orientation of impurities contained in the fuel relative to the exit orifice so that they are expelled through the orifice. Combustion of conventional distillate fuel oil such as API No. 1 and 2 is also provided.

12 Claims, 6 Drawing Figures

FUEL VISCOSITY CONTROL

FUEL VISCOSITY CONTROL

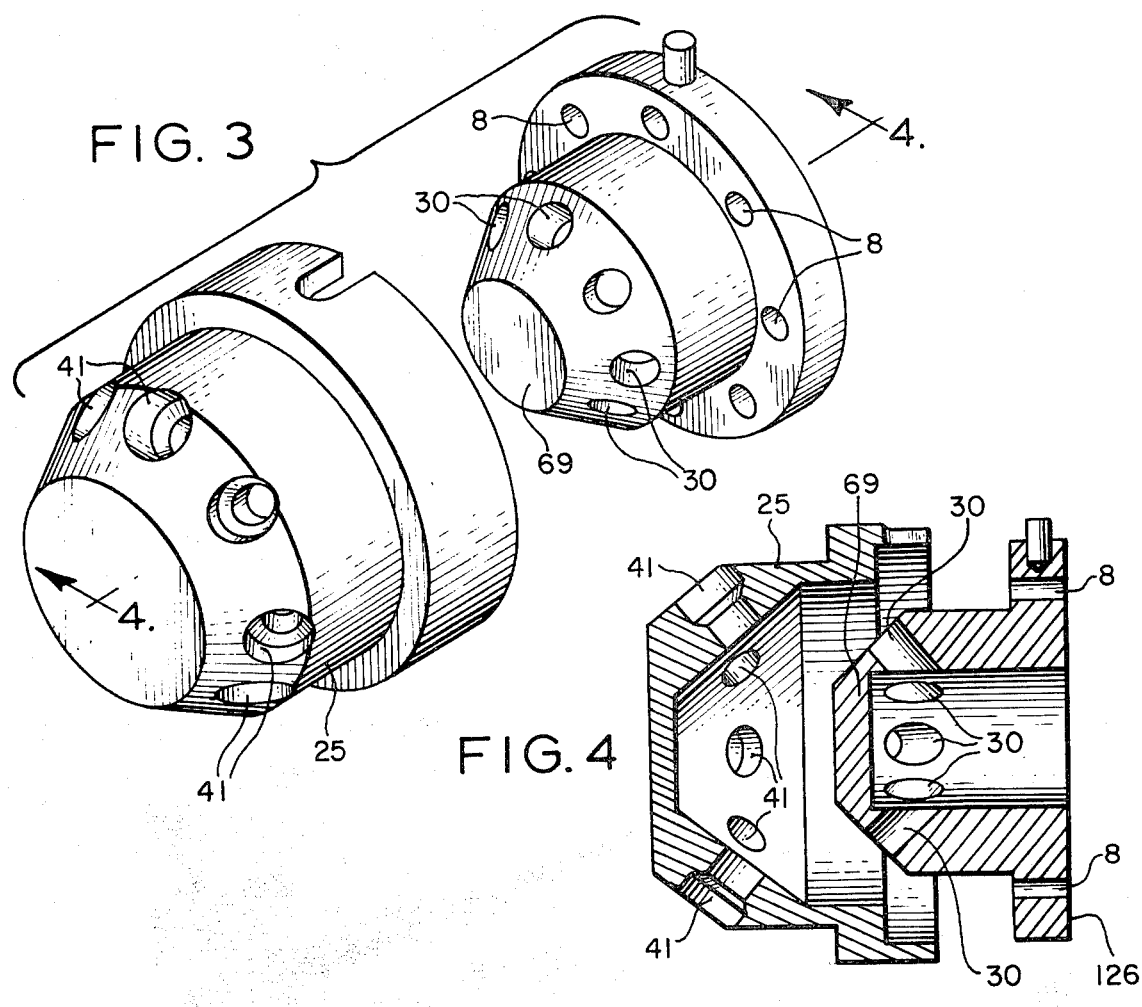
FIG. 3
FIG. 4
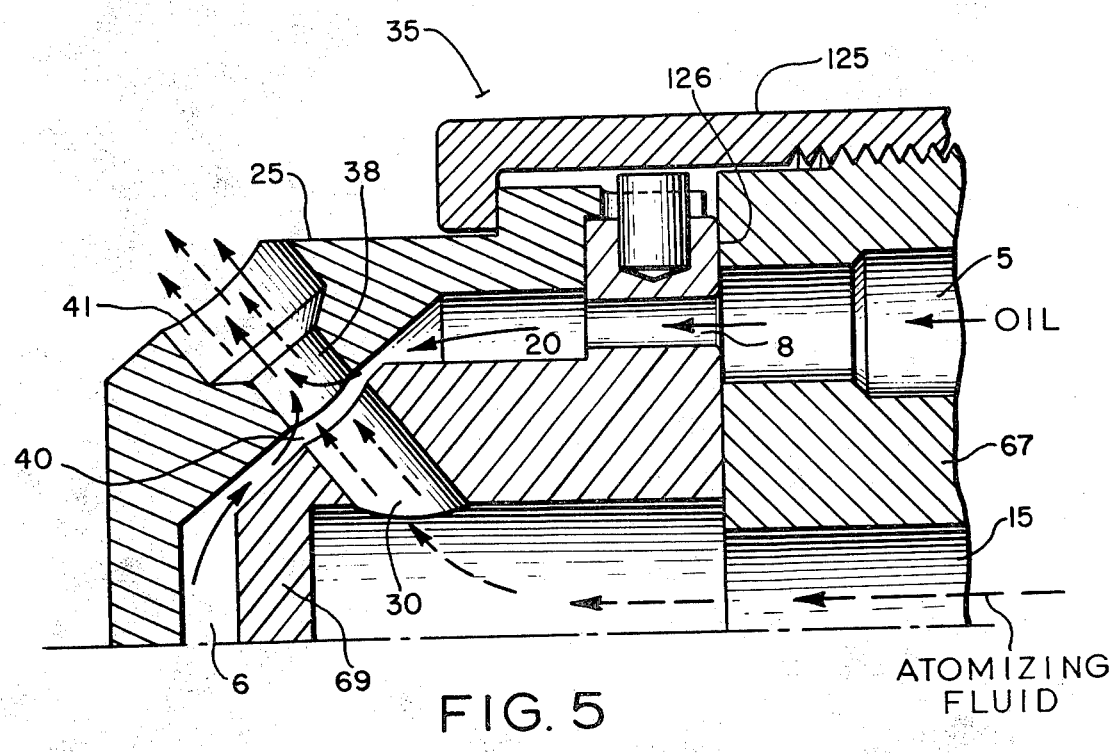
FIG. 5

HEAVY FUEL OIL NOZZLE

This is a division, of application Ser. No. 693,138 filed June 7, 1976 U.S. Pat. No. 4,141,505.

This invention pertains to liquid fuel combustion and in particular combustion of fuels having widely varying properties including so-called "heavy" oil. The system disclosed utilizes improved atomization through nozzle design and viscosity control to achieve successful combustion.

DESCRIPTION OF PRIOR ART

Historically, combustion of the so-called "heavy" oils has been extremely difficulty due to a complex hydrocarbon structure and substantial variations in the properties and constituency of the fuel. Conventional fuel oil is generally classified by the API designation #1 to #6 with the 1 to 4 range provided somewhat variable but generally consistent combustion properties. Oil designated as #5 or #6 is classified as residual and therefore has a broad range of combustion properties. Impurities of somewhat unknown value are also present in quantities which vary widely, and can include water. Recent efforts to conserve energy and dispose of by-products of industrial processes have led to the need for combustion of "waste" oil, which can include so-called cutting oil, exhausted automotive lubrication oil and other impurities. These waste oils exhibit many of the undesirable combustion characteristics of "heavy" oil and therefore are considered equivalent to "heavy" oil in the remainder of the disclosure. The variations which provide the greatest barrier to efficient combustion include very high viscosity (greater than 5000 SSU at 20° Centigrade), high vaporization temperatures, non-uniform distillation rates, and widely varying trace elements present as impurities which substantially influence combustion processes.

Examples of prior attempts to obtain satisfactory combustion of heavy oil are taught in U.S. Pat. Nos. 3,185,202, and 3,301,305, assigned to the assignee of this application. These systems essentially utilize the concept of increased residence time in the combustion chamber to overcome varying fuel properties and to insure complete combustion without deposition of carbon on the combustion chamber services. While these approaches have been moderately successful, they have included various complicated devices in order to produce highly turbulent combustion gas and vapor flow patterns, and generally speaking do not provide combustion in the type of relatively compact chamber disclosed in this invention.

Other approaches to combustion of heavy oil utilizing attempts to improve atomization through nozzle design include U.S. Pat. Nos. 1,428,896, 3,770,209, and 3,840,183.

In general, these approaches have resulted in highly complicated nozzle geometries involving many internal passages and intricate air-oil intersections. These structures are sensitive to variations in the oil characteristics and constituents indicated above resulting in combustion systems of relatively low reliablity. Frequent cleaning of nozzles is required, and attempts to operate over long periods without substantial maintenance have not generally been successful.

Prior art nozzles discussed above generally utilize atomizing fluids which generate fuel particles having asymmetrical velocity and acceleration components. These particles tend to impinge on internal passages and agglomerate or recombine, requiring additional atomizing air to re-shear or re-atomize the agglomerated fuel. The re-atomization necessity provides non-uniform fuel/air mixture and results in poor or inefficient combustion.

In contrast, the invention disclosed in this application accomplishes proper atomization and good combustion as measured by accepted state of the art indicators such as absence of deposited carbon and low backarach smoke scale in the combustion gases using a relatively simple nozzle, which is easy to clean and is inherently insensitive to fuel property variations.

Accordingly it is the object of this invention to provide an improved atomizing nozzle for liquids having varying properties.

It is a further object of this invention to provide a nozzle for combustion of heavy oil.

An additional object of this invention is to provide a system for reliable and efficient combustion of "waste" oil.

A further object of the invention is to provide a system for atomizing heavy and waste oils which allows passage of certain insoluble impurities contained in the oil.

An additional object of this invention is to provide a method of combustion for fuel oils over the full API fuel oil grade range of 1 thru 6.

SUMMARY OF THE INVENTION

Successful combustion of high viscosity or heavy oils is accomplished by the system of this invention through the use of a unique nozzle design in conjunction with self adjusting viscosity control of the fuel. In particular, the nozzle utilizes a circulating oil flow contained in a cavity adjacent to the atomizing fluid source and exit orifices. Fuel exiting from the cavity is "sheared" by the atomizing fluid passing through the cavity with recombination of the fuel prevented by atomizing air passages which are coaxial with nozzle exit passages, containing critically sized exit and expansion orifices.

Preheated fuel is withdrawn from a remote storage tank after which entrained air and/or vapors or gases are separated and additional automatically controlled heat is supplied, in order to provide a relatively constant viscosity fuel to the burner described above. Combustion proceeds in a relatively small refractory chamber which utilizes recirculation zones to stabilize the combustion process prior to completed combustion gas exiting through the combustion chamber choke.

This system allows combustion of heavy or residual fuels in compact combustion chambers without deposition of carbon on the chamber interior or significant reduction in combustion chamber life. The nozzle design employed also provides for expulsion of impurities contained in the oil and allows them to be ejected into the combustion system where they can be utilized and in many cases become a part of the combustion process.

DESCRIPTION OF THE DRAWINGS

FIG. 3 Detail of nozzle design and salient component parts prior to assembly of the invention.

FIG. 4 Additional sectional view of salient parts of the novel burner nozzle prior to assembly.

FIG. 5 Partial section of the nozzle in substantially increased detail showing salient features of the invention, such as the exit orifice, the sharp edged orifice, and the oil circulating cavity.

In connection with a preferred embodiment it will be understood that it is not intended to limit the invention to that embodiment. On the contrary, it is intended to cover all alternatives, modifications, and equivalents as may be included within the spirit and scope of the invention as defined by the pendent claims.

Figure 1:
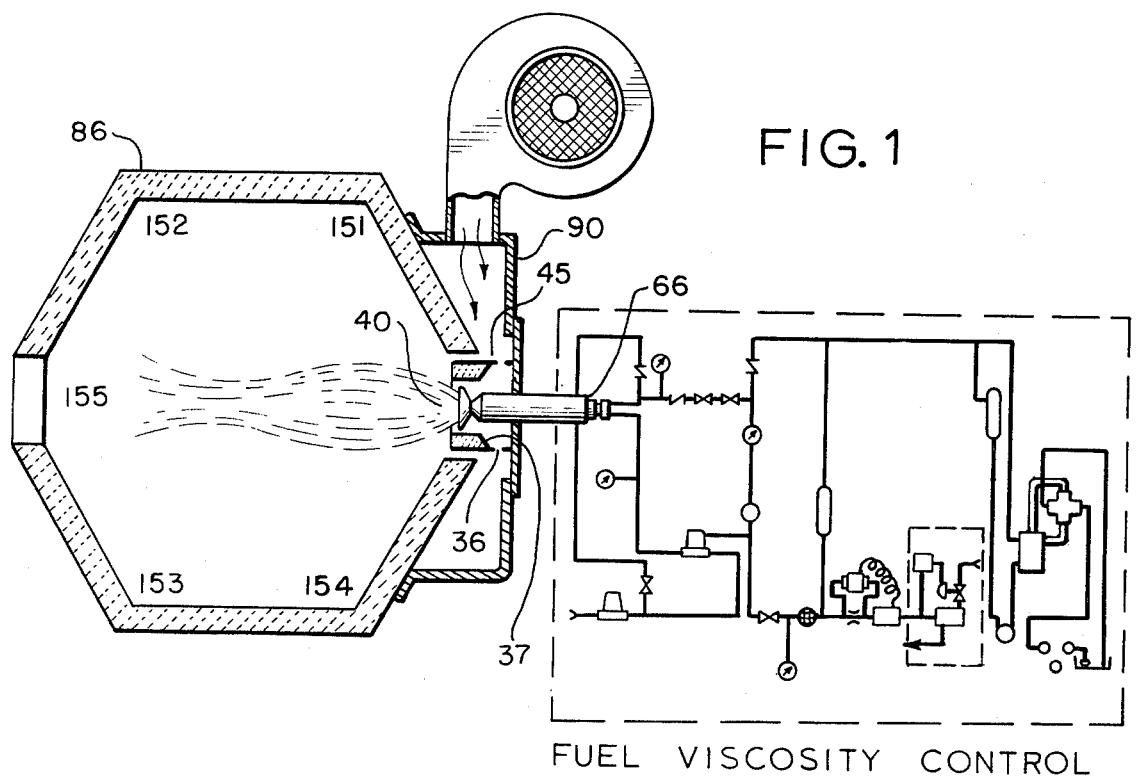
FIG. 1 Combustion system including nozzle, burner assembly, combustion chamber, and viscosity control system.
Figure 2:
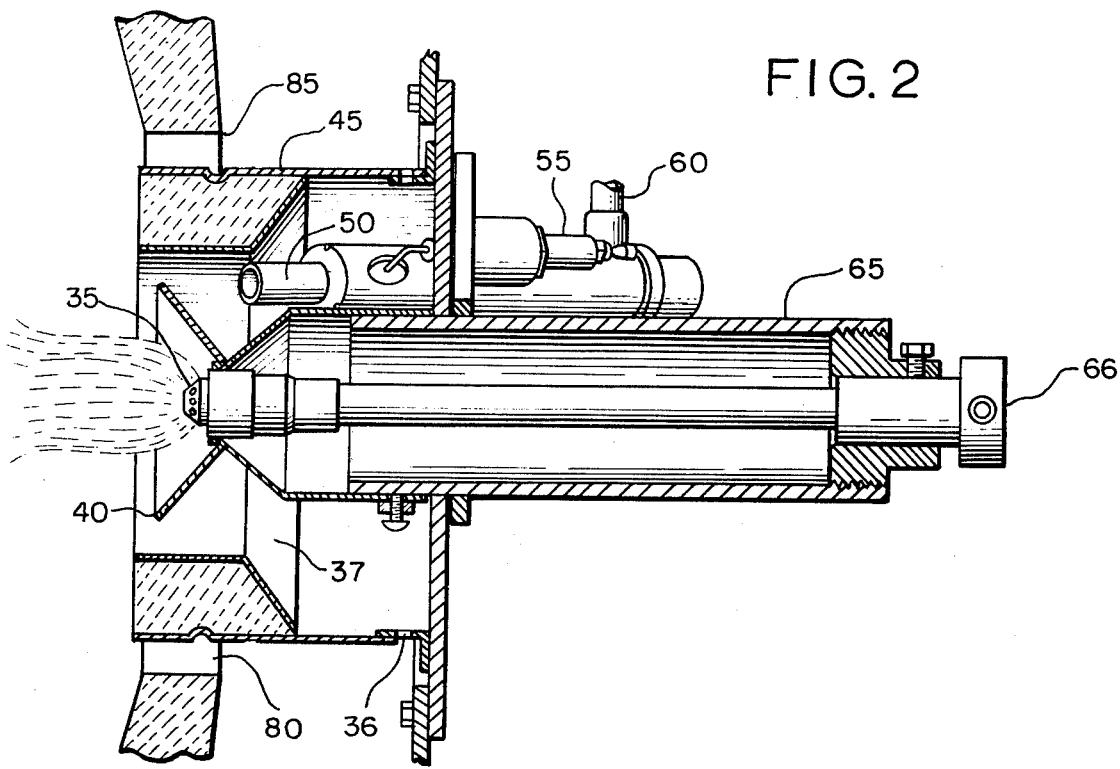
FIG. 2 Burner assembly including nozzle pilot flame assembly and air induction means.

The burner assembly preferred embodiment as shown in FIGS. 1 and 2 consists of a burner assembly 65 combustion chamber, 86, and combustion air box and blower, 90. With reference to FIG. 2 the burner assembly contains an atomizing nozzle 35 internally mounted and coaxial with burner skirt 45, contained near the apex of the stabilizing cone 40, also mounted coaxial to the burner nozzle axis. Combustion air for the burner enters through primary air inlet 36 and passage 37 in the burner skirt. Secondary air enters the peripheral passage 80 between the skirt 45 and combustion chamber refractory 85.

An electrically ignited pilot is typically used consisting of a pilot ignition 250, a pilot field supply 60, and a pilot spark igniter 55.

The burner nozzle consists of the nozzle holder 67 (Ref. FIG. 5) containing the atomizing fluid inlet and nozzle innermember 69 having a plurality of atomizing fluid orifices 30. A nozzle outermember or shell 25 is mounted so as to encircle the nozzle holder and contains a plurality of exit orifices 38, expansion orifice 41 and sharp edged orifice 7 held in alignment with the atomizing air inlet orifice 30 by the nozzle retainer 125. The nozzle outer member 25 is supported at a shoulder 126 on the nozzle holder 67 so as to maintain a circulating cavity 6 between the nozzle innermember and shell.

In operation, reference FIGS. 2 and 5, liquid fuel under pressure enters the oil inlet passing through orifice 8 of the nozzle innermember 69. Fuel is supplied through the inlet conduit 66 (FIG. 2) which terminates in the nozzle holder 67. The fluid enters through the inlet 15 under pressure somewhat less than that of the fuel entering through atomizing liquid passage 8. The cavity 20 formed by nozzle innermember 69 and shell 25 provides a passage for circulating oil flow within the cavity. The cavity design provides a radial "minimum gap" 40 which is circumferential and adjacent to both the atomizing air orifice 30 exit, and the sharp edged orifice 7 of the nozzle exit orifice 38. This gap aligns certain solids which pass through the fuel filters and permits their expulsion by the atomizing air flowing through 30. The alignment of these particles is crucial since the minimum orifice 40 and the flow passage or cavity 6 cooperate to allow these particles to move into the exit orifice with an attitude which allows their expulsion and subsequent combustion.

Returning now to the oil under pressure circulating in the cavity 6, cavity geometry and the pressure differentials between 6 and the atomizing air inlet 15 is such that oil flows in a path which is radial to the sharp edged orifice 7, where it is sheared or atomized by the fluid flow from the atomizing fluid orifice 30 forming particles of oil which move through the exit orifice 38. This action, produced by the radial oil flow at the sharp edged orifice 7 and the atomizing fluid flow through the orifice 30 results in generating a stream of fluid entrained fuel particles which pass rapidly through the exit orifice 38 without agglomeration, and into the expansion orifice 41 where they undergo additional expansion and are then further entrained by the primary air flowing past the nozzle. Radial flow is essential in the formation of fuel particles which are repelled by fuel flowing from the counterparts location on the opposite side ofthe minimum gap. This essentially neutralizes radial velocity components, resulting in fuel particles which flow essentially in a direction parallel to the exit orifice axis, thereby minimizing wall attachment. The length of the exit orifice 38 has also been found to be significant relative to the length of the minimum gap 40 and to the amount of agglomeration of the particles sheared by sharp edged orifice 7 and in the amount of recombination of the sheared oil particles which might occur in the time of their passage between the sharp edged orifice 7 the exit orifice 38 and resulting flame shape. The minimum amount of agglomeration accompanying the structure disclosed and claimed whererin (ref. FIG. 5) the length of the exit orifice "x" is four times that of the minimum gap "y" has resulted in a functional and reliable burner usable in small combustion chambers.

Combustion of the atomized fuel now entrained by the primary air adjacent to the nozzle shell 25 proceeds as a spinning action is imparted by the secondary air passing through the peripheral passage 80 and containing spinning vanes. Ignition and combustion occurs in the region just outside the stabilizing cone 40 and is accomplished by the ignitor and pilot assembly 50. Although a gaseous pilot which is electrically ignited is disclosed it will be realized by those skilled in the art that any other means of ignition such as direct electric arc or other pilot systems can be utilized.

The now ignited mixture of primary, secondary, and atomized fuel droplets proceed into the combustion chamber 86 where the circulation zones 152 and 153, 154 and 151 are established to stabilize the complex combustion phenomena. Combustion gases formed by the process then proceed through the circular combustion chamber choke or exit 155 where they proceed to scrub the heat exchange surfaces of any particular or desired configuration (not shown).

Figure 6:
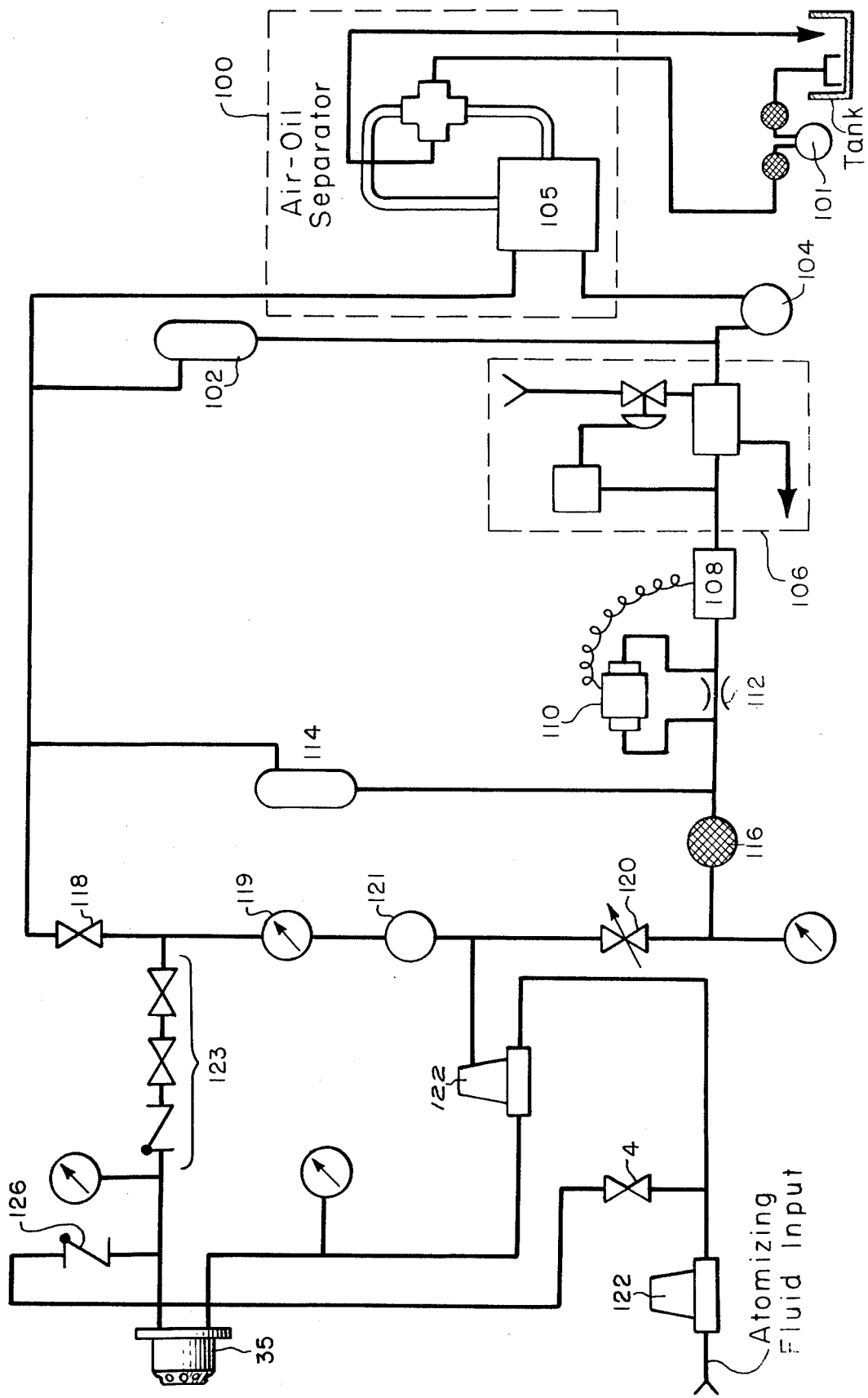
FIG. 6 Schematic of fuel oil viscosity control.

Control of the fuel viscosity as supplied to the fuel nozzle 35 is accomplished through the system depicted in FIGS. 1 and 6. In particular reference to FIG. 6, the system disclosed provides for proper oil flow through the nozzle for a wide range of oil characteristics usually encountered. In operation, oil stored in a remote tank is preheated and pumped to the separator 100 by fuel supply pump 101. The separator maintains a reservoir of deaerated oil and its reservoir 105, and also provides for returning excess oil and entrained gases and/or vapors to the fuel storage tank.

Preheated deaerated oil is now supplied to the fuel pump 104 whose output is monitored by a by-pass type fuel pressure relief valve 102, whereby excessive fuel which causes the pressure to exceed a preset value is returned to the reservoir 105.

Preheated and deaerated oil now operating at a pressure controlled by the combination of fuel pressure relief valve 102 is now pumped into the optional fuel steam heater 106. The function of the heater 106 and 108 are identical and both are only disclosed for completeness. The following description will involve a system where the electric fuel heater has been selected and provides the major source of viscosity control. The fuel oil is pumped through the electric heater 108 and continues on through a fixed orifice 112. A differential pressure switch 110 is connected to monitor the fuel pressure drop across the orifice 112 and also controls the application of heat to the fuel heater 108, in a manner which continues to apply heat until the pressure drop is less than a certain preset value. The pressure of the heated fuel oil is further monitored by pressure regulating valve 114, prior to passing through the filter 116. The now correct viscosity and filtered fuel is pumped through the fuel metering valve 120 whose throughput (volume flow) is controlled by the demand for heat on the overall combustion system and therefore forms a capacity control for the burner. The pressure of fuel exiting the metering valve 120 is monitored by differential pressure valve 122 which also monitors the pressure of the incoming atomizing fluid. The function of differential regulator 122 is to maintain a proper pressure differential between the atomizing fluid and the fuel inlet to the nozzle 35. As discussed above, it is desirable to maintain a fuel pressure slightly in excess of that of the atomizing fluid in order to insure the radial flow of fuel through the sharp edged orifice 7 and exit orifice 30 of the nozzle. Other pressure temperature and flow control components, namely, the low fuel temperature switch 121, dial thermometer 119, bypass solenoid valve 118 and the burner safety valve assembly 123 and check valve 126 do not form part of this invention and are only included as part of the disclosure of a complete combustion system.

The system described above comprising the burner assembly, combustion chamber and fuel viscosity control provide reliable combustion of heavy fuel in small combustion over a wide variety of fuel characteristics. In practice it has been found that the combustion obtained with this combination requires minimal maintenance and operates with good efficiency over a ratio of burner demand in excess of 6 to 1. Deposits of carbon on the refractory of the combustion chamber have been essentially eliminated and operation of the nozzle has been made substantially more reliable than available units through the ability of the burner nozzle to pass relatively large amounts of unfilterable solids normally found in fuels of this type. This has been accomplished without restoring to combustion assists such as ultrasonic atomization or water injection and provides a simple and economic way to efficiently utilize the large potential of fuel energy available in the so-called heavy or residual oils, and waste oil. Combustion of lighter distillates is of course easily accomplished since many of the above mentioned difficulties do not exist.

Thus, it is apparent that there has been provided in accordance with the invention a novel combustion system that fully satisfies the objects, aims and advantages set forth above. While the invention has been described in conjunction with specific embodiments it is evident that many alternatives, modifications and variations will be apparent to those skilled in the art in light of the foregoing description. Accordingly, it is intended to embrace all such alternatives, modifications, and variations as included in the spirit and broad scope of the following claims.

I claim:

1. A combustion system for liquid fuel having in combination;
   a combustion air source,
   a fluid source for supplying atomizing fluid at a first pressure,
   a combustion chamber,
   a liquid fuel source for supplying non atomized fuel at a second pressure greater than said first pressure,
   a burner assembly with combustion air inlets ignition means and an atomizing fuel nozzle comprising;
   an inner member having a truncated conoidal outer surface, an inner surface containing a plurality of passages with inner and outer ends terminating in said inner and outer surfaces respectively, for conveying pressurized atomizing fluid, said inner member passage inlets abutting said source of atomizing fluid and said outlet ends terminating in said conoidal outer surface; and
   a truncated conoidal outer shell having outer and inner surfaces, mounted in spaced concentric and axial relationship to said inner member, said shell defining a plurality of passages having inner and outer ends, said passages essentially in alignment with said inner member passages, wherein said outer shell inner surface and said inner member outer surface define a fuel circulation cavity between said inner member outer surface and said outer shell inner surface, said cavity intersecting said inner member and outer shell passages at their respective outer and inner ends and communicating with said fuel source,
   wherein the inner member and outer shell passages and fuel circulation cavity cooperate to propel fluid entrained liquid fuel particles from said outer shell passage outlet.

2. the combustion system of claim 1 further including a critical gap defined by said fuel circulation cavity adjacent to said inner member and outer shell passage intersections.

3. The combustion system of claim 1 wherein said outer shell passage further includes;
   a sharp edged orifice defined by said inner end of said passage,
   an exit orifice abutting said sharp edged orifice; and
   an expansion section abutting said exit orifice and terminated by said passage outer end.

4. The combustion system of claim 3 wherein the length of the exit orifice is essentially four times the critical gap.

5. The combustion system of claim 2 wherein the circulation cavity fuel flow is essentially radial to said gap.

6. A combustion system for liquid fuel having in combination;
   a combustion air source,
   an atomizing fluid source,
   a combustion chamber,
   a non atomized liquid fuel source,
   a burner assembly with combustion air inlets,
   ignition means,
   an atomizing fuel nozzle, comprising;
   an inner member having a truncated conoidal outer surface, an inner surface, and containing a plurality of passages with inner and outer ends terminating in said inner and outer surfaces respectively conveying pressurized atomizing fluid, said passage inlets abutting said source of atomizing fluid, and said outlet ends terminating in said conoidal surface.
   a truncated conoidal outer shell having inner and outer surfaces mounted in spaced concentric and axial relationship to said inner member, said shell defining a plurality of passages having inner and outer ends, said passages essentially in alignment with said inner member passages, wherein said outer shell inner surface and said inner member outer surface define a circulation cavity between said inner member and said outer shell, said cavity intersecting said inner member and outer shell passages at their respective outer and inner ends, means supplying said non atomized liquid fuel under pressure greater than said atomizing fluid to said cavity;

wherein a stream of atomizing fluid flowing in said inner passage and exiting said inner passage outer end intersects liquid fuel flowing in said cavity generating a stream of fluid entrained liquid fuel particles exiting said outer passage outer end.

7. The combustion system of claim 5 wherein the atomizing liquid stream and liquid fuel intersect at essentially right angles.

8. The combustion system of claim 5 wherein the liquid fuel flow in said cavity is essentially radial to the inner end of said outer shell passage.

9. In a combustion system for liquid fuel having;
a combustion chamber, a combustion air source, means supplying pressurized atomizing fluid, a burner having primary and secondary air sources, ignition means, an atomizinng fuel nozzle; and
a liquid fuel having viscosity control system comprising;
a first fuel pump;
a first fuel heater supplying preheated fuel from a reservoir;
air separator means for deaerating said preheated fuel, and an orifice;
second fuel pumping means and pressure control means causing flow of deareated, pressurized fuel through said orifice;
means continuously measuring the pressure drop caused by said fuel flowing through said orifice;
second fuel heating means responsive to said pressure drop measurement so as to maintain maximum and minimum value; and, wherein said nozzle comprises;

an inner member having a plurality of inner passages with first and second ends, for carrying an atomizing fluid;
an outer member having a plurality of outer passages having first and second ends, each outer member passage containing a sharp edged orifice adjacent said second end, and an exit orifice abutting said sharp edged orifice, and an expansion section adjacent to said outer member first end; means mounting said inner and outer members and inner and outer passages in spaced relationship defining a liquid fuel circulation cavity, said cavity communicating with the second end of the outer passage and the first end of the inner passage, a minimum gap defined by said cavity adjacent to the second end of said inner passage and the first end of said outer passage, mens supplying pressurized non atomized liquid fuel to said circulating cavity, means supplying pressurized atomizing fluid to said inner member, said fuel pressure greater than said fluid pressure, wherein liquid flowing in said circulating cavity is sheared by atomizing fluid flowing in said inner passage at said sharp edged orifice causing air entrained particles of liquid to be expelled from said expansion section of said outer passage.

10. The combustion system of claim 9 wherein the combustion chamber comprises;
a cylinder terminated by first and second truncated conoidal ends, said cylinder and conoid internally intersecting in an obtuse angle, and said first truncated conoidal end defining a combustion gas choke, and said second truncated conoidal end defining an aperture, means mounting a combustor in said aperture, said combustor supplying atomized fuel, primary air, secondary air and ignition, wherein said choke combustor and cylinder-conoid intersection cooperate to establish recirculation zones of said fuel and air in the vicinity of said intersections to enhance within the chamber.

11. The combustion system of claim 9 wherein said critical gap acts to align fuel impurities causing them to pass through said outer passage and be expelled from said expansion orifice.

12. The combustion system of claim 9 wherein the liquid flow in said cavity is essentially radial to said passages.

* * * * *